United States Patent
Wang et al.

(10) Patent No.: US 8,056,187 B2
(45) Date of Patent: Nov. 15, 2011

(54) HINGE ASSEMBLY

(75) Inventors: Jin-Xin Wang, Shenzhen (CN); Chao-Zhong Fu, Shenzhen (CN); Jian Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 390 days.

(21) Appl. No.: 12/337,761

(22) Filed: Dec. 18, 2008

(65) Prior Publication Data

US 2010/0037430 A1 Feb. 18, 2010

(30) Foreign Application Priority Data

Aug. 13, 2008 (CN) .......................... 2008 1 0303735

(51) Int. Cl.
*E05F 1/08* (2006.01)

(52) U.S. Cl. .......................................... 16/303; 16/326

(58) Field of Classification Search .................... 16/367, 16/386, 338–340, 330, 303, 380, 324, 326, 16/327; 361/679.06, 679.27, 679.28, 679.11, 361/679.12, 679.13; 379/433.12, 433.13; 455/575.1, 575.4, 575.8, 550.1, 90.3; 348/373, 348/333.06, 794

See application file for complete search history.

(56) References Cited

U.S. PATENT DOCUMENTS

| | | | | |
|---|---|---|---|---|
| 6,886,221 B2* | 5/2005 | Minami et al. | .................. | 16/324 |
| 7,007,345 B2* | 3/2006 | Nakase et al. | .................. | 16/330 |
| 7,117,562 B2* | 10/2006 | Zuo et al. | ........................ | 16/303 |
| 7,184,275 B2* | 2/2007 | Yamaguchi et al. | .......... | 361/755 |
| 7,847,194 B2* | 12/2010 | Kuwajima et al. | ......... | 174/161 R |
| 7,895,710 B2* | 3/2011 | Takagi et al. | .................. | 16/330 |
| 2005/0220294 A1* | 10/2005 | Gupte | ..................... | 379/433.13 |
| 2006/0032020 A1* | 2/2006 | Duan et al. | .................... | 16/288 |
| 2006/0174443 A1* | 8/2006 | Takagi et al. | .................. | 16/330 |
| 2007/0094843 A1* | 5/2007 | Yang | .............................. | 16/330 |
| 2008/0092335 A1* | 4/2008 | Hu et al. | ........................ | 16/308 |
| 2010/0024165 A1* | 2/2010 | Kosugi et al. | .................. | 16/303 |

\* cited by examiner

*Primary Examiner* — Chuck Y. Mah

(74) *Attorney, Agent, or Firm* — Altis Law Group, Inc.

(57) ABSTRACT

An exemplary hinge assembly includes a shaft, a cam, a cam follower, a first elastic member, a second elastic member, a first sleeve, a second sleeve. The cam and the cam follower are sleeved on the shaft. The first elastic member is sleeved on the shaft, and configured for producing an elastic force along the shaft. The first sleeve is sleeved on the shaft, and non-rotatably connected to the cam follower. The second sleeve is sleeved on the shaft, and non-rotatably connected to the cam. The second elastic member is sleeved on the shaft, and configured for producing an elastic force for driving the first sleeve to rotate relative to the second sleeve. The controlling member resists one of the cam and cam follower, and capable of driving the cam away from the cam follower.

19 Claims, 5 Drawing Sheets

HINGE ASSEMBLY

BACKGROUND

1. Technical Field

The present disclosure relates generally to hinge assemblies and, more particularly, to a hinge assembly for electronic device.

2. Description of the Related Art

An electronic device such as a mobile phone, a notebook computer, or a personal digital assistant (PDA) generally has a main body and a cover pivotally mounted on the main body via a typical hinge assembly.

The typical hinge assembly includes a shaft, a rotatable stand, a fixed stand, a cam, a cam follower, a plurality of spring washers, and a nut. A flange is formed on a proximal end of the shaft, and a threaded portion is formed on a distal end of the shaft. The shaft extends through the rotatable stand, the cam, the cam follower, the spring washers, and the fixed stand. The rotatable stand and the cam are non-rotatably connected to the shaft. The nut engages with the threaded portion of the shaft, so that the spring washers produce an elastic force along an axis of the shaft. The main body of the electronic device is connected to the fixed stand, and the cover of the electronic device is connected to the rotatable stand.

However, when the electronic device is operated to an open position, the cover must be turned a predetermined angle relative to the main body by a user before the cover rotates relative to the shaft automatically via an engagement force of the cam and the cam follower. Thus, the electronic device applying the typical hinge assembly is inconvenient for use.

Therefore, a hinge assembly to solve the aforementioned problems is desired.

SUMMARY

An exemplary hinge assembly includes a shaft, a cam, a cam follower, a first elastic member, a second elastic member, a first sleeve, a second sleeve. The cam and the cam follower are sleeved on the shaft. The first elastic member is sleeved on the shaft, and configured for producing an elastic force along the shaft. The first sleeve is sleeved on the shaft, and non-rotatably connected to the cam follower. The second sleeve is sleeved on the shaft, and non-rotatably connected to the cam. The second elastic member is sleeved on the shaft, and configured for producing an elastic force for driving the first sleeve to rotate relative to the second sleeve. The controlling member resists one of the cam and cam follower, and capable of driving the cam away from the cam follower.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

References will now be made to the drawings to describe embodiments of the present hinge assembly, in detail.

Figure 1:
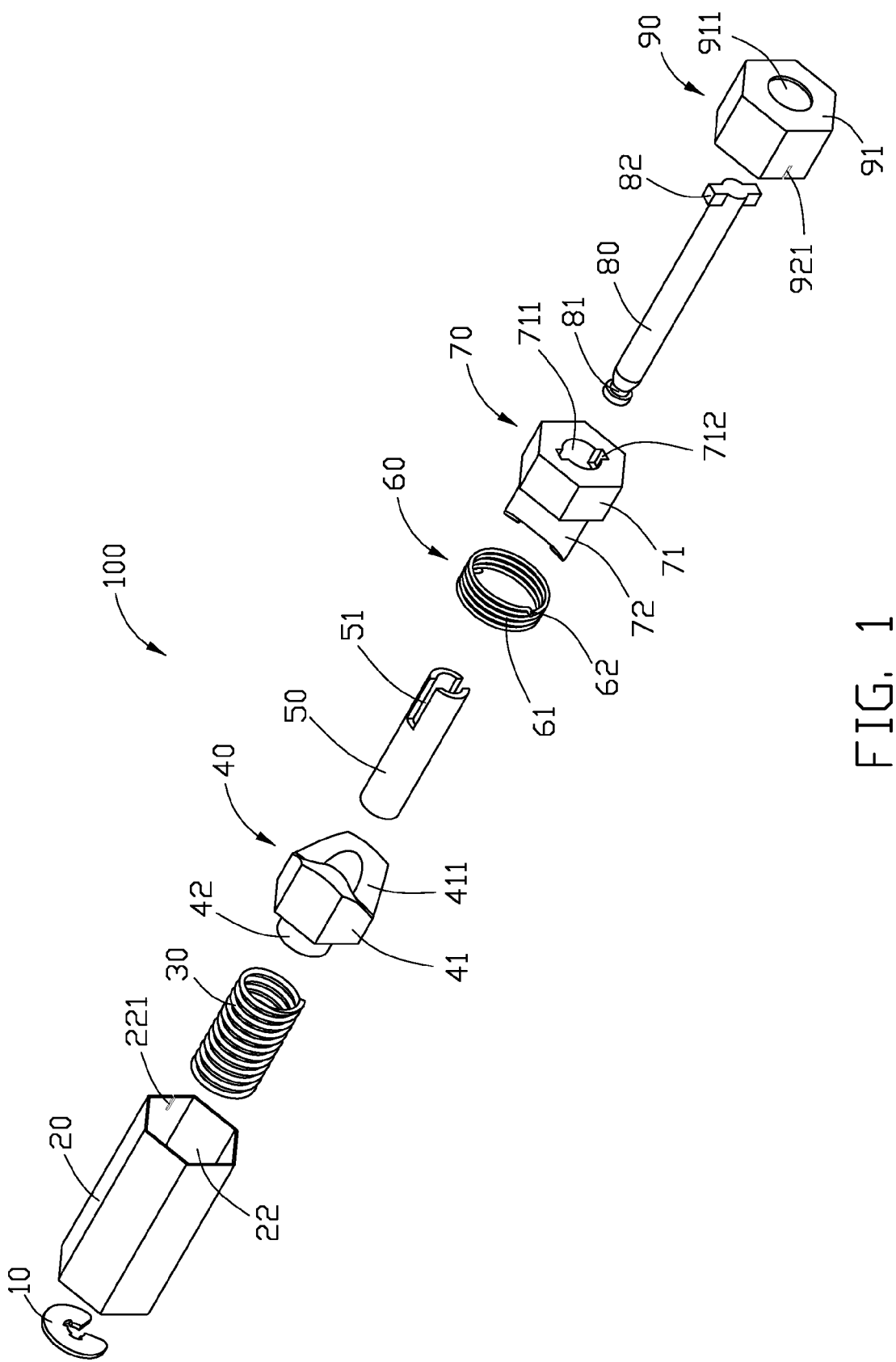
FIG. 1 is an exploded, isometric view of an embodiment of a hinge assembly, the hinge assembly including a retaining ring, a first and second sleeve, a first and second elastic member, a cam, a cam follower, a controlling member, and a shaft.
Figure 2:
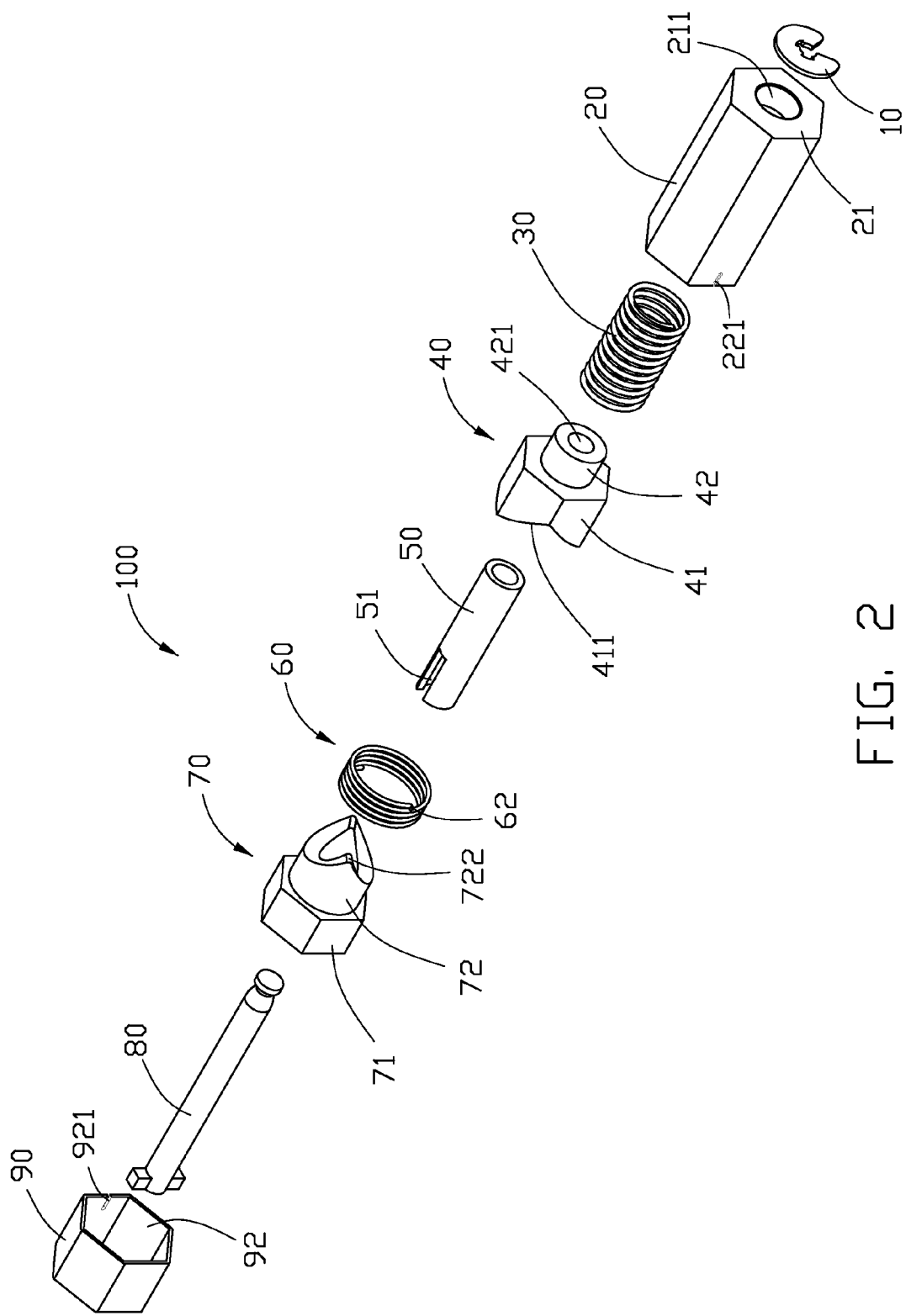
FIG. 2 is similar to FIG. 1, but viewed from another aspect.
Figure 3:
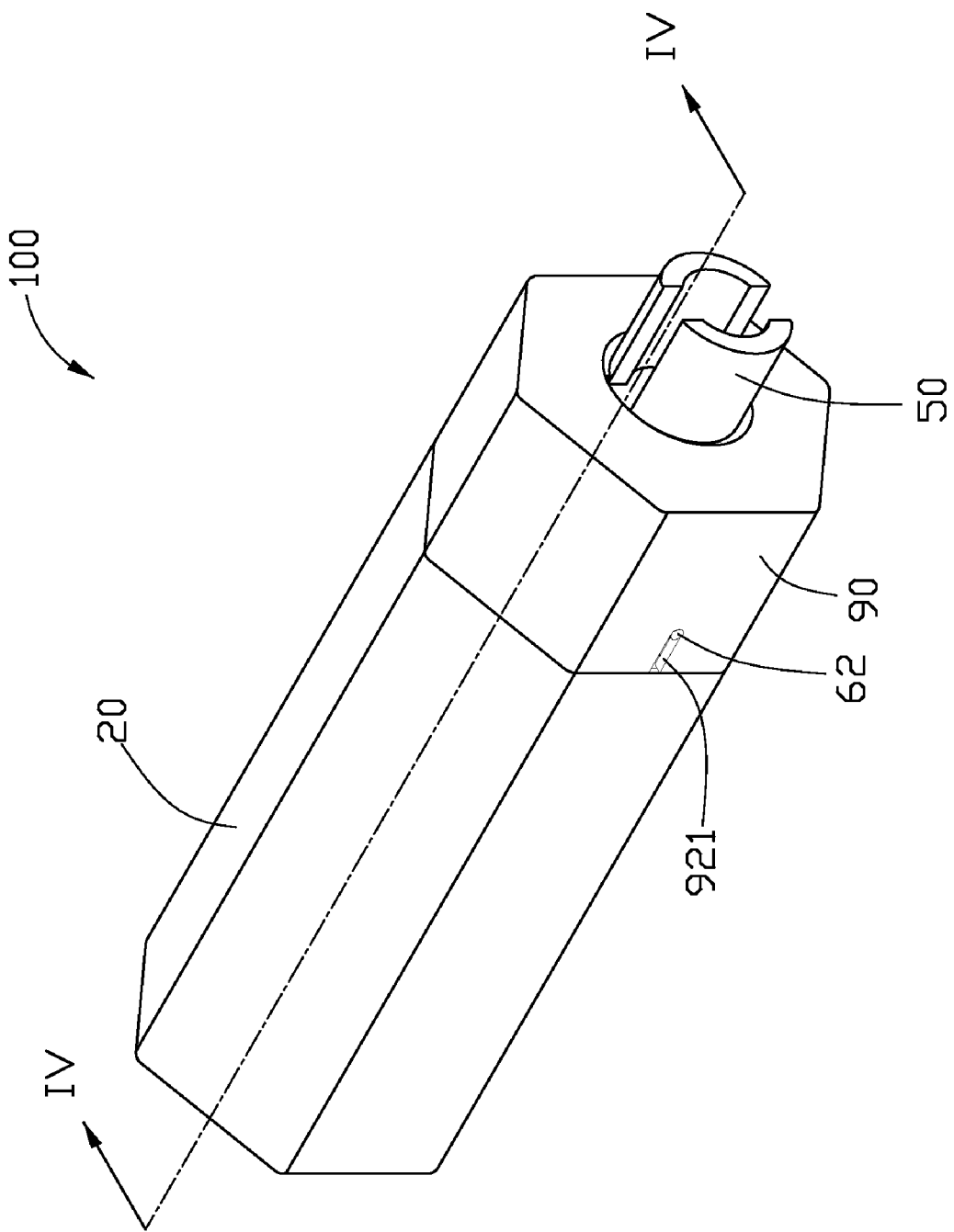
FIG. 3 is an assembled, isometric view of the hinge assembly of FIG. 1.
Figure 4:
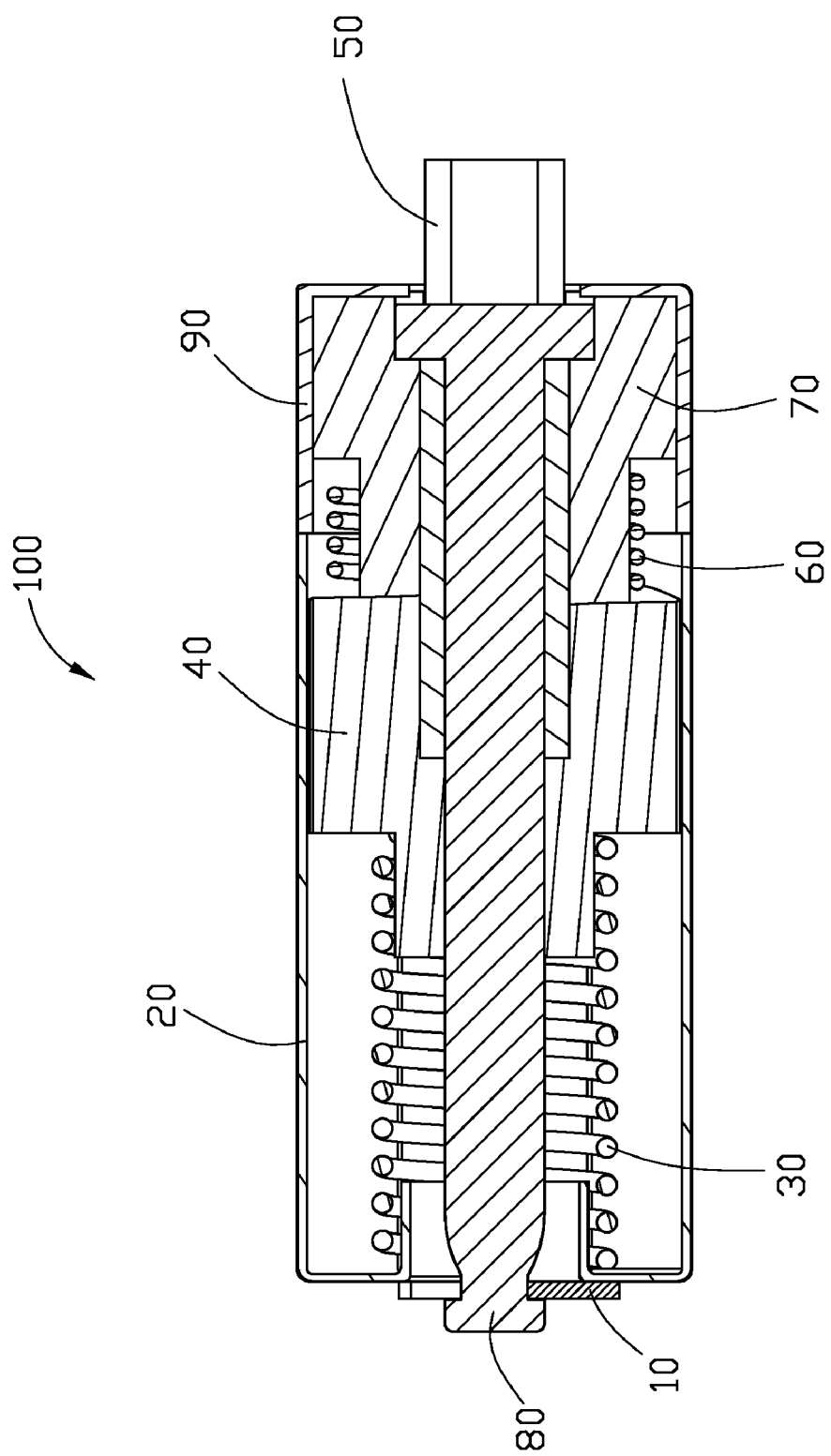
FIG. 4 is a cross-sectional view of the hinge assembly of FIG. 3, taken along a line IV-IV.

Referring to FIGS. 1 and 2, an embodiment of a hinge assembly 100 includes a retaining ring 10, a first sleeve 20, a first elastic member 30, a cam follower 40, a controlling member 50, a second elastic member 60, a cam 70, a shaft 80, and a second sleeve 90.

The first sleeve 20 is configured for connecting to a main body of an electronic device (not shown). The first sleeve 20 has a half-opened end 21 and an opened end 22 forming a hollow receiving space (not labeled). A pivot hole 211 is defined in a center portion of the half-opened end 21. A first assembling groove 221 is defined in a sidewall of the first sleeve 20 from the opened end 22. In the illustrated embodiment, the first sleeve 20 is a hollow hexagonal column, and made of a metal.

A first end of the elastic member 30 is received in the receiving space and abuts an interior surface of the half-opened end. In the illustrated embodiment, the first elastic member 30 is a helical compressed spring.

The cam follower 40 includes a restricting portion 41 similarly shaped to the receiving space of the first sleeve 20 such that the restricting portion is capable of sliding in the first sleeve 20. In the illustrated embodiment, the restricting portion 41 is a hollow hexagonal column corresponding to the first sleeve 20. Two valleys 411 are defined in a first end of the restricting portion 41. A cylindrical protrusion 42 extends from a second end of the restricting portion 41 opposite to the first end. A through hole 421 extending through to the valleys 411 is defined in a center portion of the protrusion 42.

The controlling member 50 is a hollow column. The controlling member 50 defines two elongated cutouts 51 in opposite sides of the controlling member 50 extending from one end to a middle portion of the controlling member 50.

The second elastic member 60 includes a main portion 61 and two protruding ends 62 extending from two ends of the main portion 61. In this embodiment, the second elastic member 60 is a torsion spring.

The cam 70 includes a restricting portion 71 and a cam portion 72 extending from an end of the restricting portion 71. The restricting portion is similarly shaped to the second sleeve 90. In the illustrated embodiment, the restricting portion 71 is a hexagonal column. A circular positioning hole 711 and two assembling slots 712 are defined in a center portion of the restricting portion 71. Two peaks 722 configured for engaging with the valleys 411 of the cam follower 40 are formed on opposite sides of an end of the cam portion 72. In the illustrated embodiment, the cam portion 72 is cylindrical shaped.

An annular groove 81 configured for receiving the retaining ring 10 is defined in a first end of the shaft 80. Two assembling portions 82 configured for engaging with the assembling slots 712 of the cam 70 are formed on opposite sides of a second end of the shaft 80 opposite to the first end. In the illustrated embodiment, the shaft is cylindrical shaped.

The second sleeve 90 is configured for connecting to a cover of the electronic device (not shown) and receiving the cam 70. The second sleeve 90 includes a half-opened end 91 and an opened end 92. A pivot hole 911 is defined in a center portion of the half-opened end 91. A second assembling groove 921 is defined in the sidewall of the second sleeve 90 from the opened end 92. In the illustrated embodiment, the second sleeve 90 is a hollow hexagonal column, made of a metal, and shorter than the first sleeve 20.

Referring to FIGS. 1 through 4, in assembling the hinge assembly 100, the shaft 80 extends through the cam 70, the second elastic member 60, the controlling member 50, the cam follower 40, the first elastic member 30, and the first sleeve 20, in that order. The retaining ring 10 engages in the annular groove 81 of the shaft 80. The peaks 722 of the cam 70 engage tightly in the valleys 411 of the cam follower 40 because of an axial elastic force of the first elastic member 30. One protruding end 62 of the second elastic member 60 is inserted into the first assembling groove 221 of the first sleeve 20, and the other protruding end 62 is inserted into the second assembling groove 921 of the second sleeve 90. The second sleeve 90 sleeves on the restricting portion 71 of the cam 70, so that the second elastic member 60 produces a torsion force between the second sleeve 90 and the first sleeve 20. The torsion force of the second elastic member 60 is smaller than an engaging force between the cam 70 and the cam follower 40. The assembling portions 82 of the shaft 80 extend through the cutouts 51 of the controlling member 50, and engage in the assembling slots 712 of the cam 70. An end of the controlling member 50 defining the cutouts 51 protrudes the pivot hole 911 of the second sleeve 90.

Figure 5:
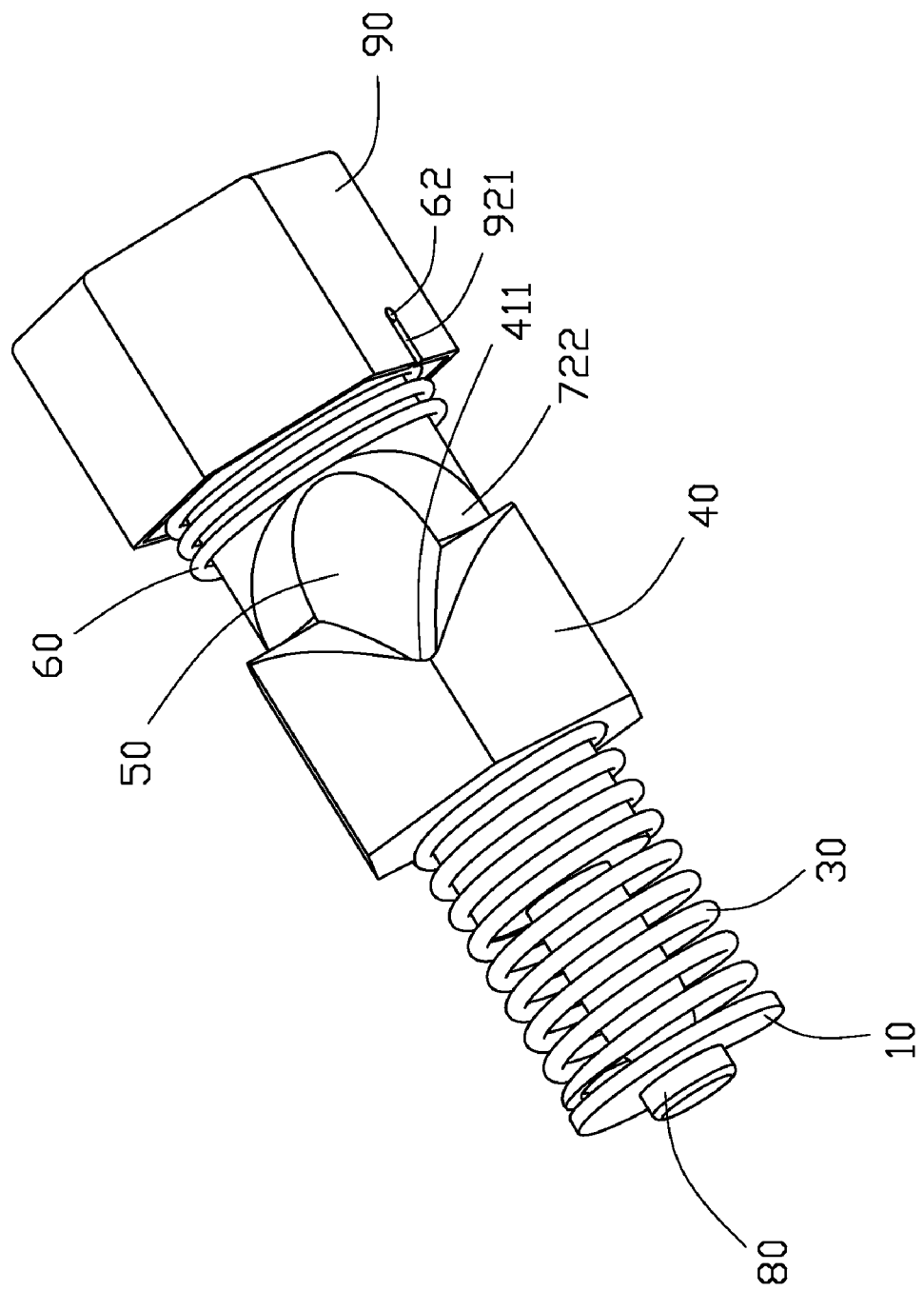
FIG. 5 is an assembled, isometric view of the hinge assembly of FIG. 3 without the first sleeve.

When the electronic device using the hinge assembly 100 is operated to an opened position, the controlling member 50 is urged by an external force. The cam 40 together with the controlling member 50 slides in the first sleeve 20 a certain distance, so that the peaks 722 of the cam 70 disengage from the valleys 411 of the cam follower 40. Then, the first elastic member 30 is compressed, and produces an elastic force. The second sleeve 90 is driven to rotate relative to the first sleeve 20 by the torsion force of the second elastic member 60. The cam 70 is driven to rotate by the second sleeve 90 relative to the cam follower 40 at the same time (as shown in FIG. 5). Since the first sleeve 20 is connected to the main body of the electronic device, and the second sleeve 90 is connected to the cover of the electronic device, the cover automatically rotates relative to the main body via the hinge assembly 100. When the external force is removed from the controlling member 50, the cam follower 40 engages with the cam 70 again via the elastic force of the first elastic member 30. Therefore, the cover is positioned at a predetermined position relative to the main body. When the electronic device using the hinge assembly 100 is operated to a closed position, the cover is driven to rotate to a certain angle by another external force. At the same time, the cam 70 is driven to rotate by the second sleeve 90 relative to the cam follower 40, and the first elastic member 30 is compressed to produce an elastic force. After that, the another external force is released from the cover. The cover rotates to the closed position via an engaging force of the cam 70 and the cam follower 40. When the cover closes to the main body, a torsion force is stored in the second elastic member 60.

If the electronic device applying the hinge assembly 100 needs to be opened, only the controlling member 50 needs to be pressed. In addition, the cam 70 and the cam follower 40 are respectively received in the first sleeve 20 and the second sleeve 90, so no friction is created between the cam 70 and the cover, and between the cam follower 40 and the main body, thus reducing abrasion of the cover and the main body of the electronic device.

In an alternative embodiment, positions of the cam 70 and the cam follower 40 may be exchanged. Here, the controlling member 50 extends through the cam follower 40, and resists the cam 70. In use, the controlling member 50 can push the cam 70 away from the cam follower 40.

It should be pointed out that, the cam 70 may form more than two peaks 722, and more than two valleys 411 may be formed on the cam follower 40. In addition, the second elastic member 60 can directly connect to the cam 70 with the cam follower 40, thus producing the elastic force to drive the cam 70 to rotate relative to cam follower 40. Therefore, the second sleeve 90 should rotate relative to the first sleeve 20. Furthermore, the first elastic member 30 may be a plurality of spring washers. The retaining ring 10 can be another fastening member, such as a nut. In this embodiment, a threaded portion should be formed on the shaft 80, and the nut engages with the threaded portion.

It is believed that the present embodiments and their advantages will be understood from the foregoing description, and it will be apparent that various changes may be made thereto without departing from the spirit and scope of the or sacrificing all of its material advantages, the examples hereinbefore described merely being preferred or exemplary embodiments of the invention.

What is claimed is:

1. A hinge assembly, comprising:
    a shaft;
    a cam non-rotatably sleeved on the shaft;
    a cam follower sleeved on the shaft and rotatable engaging with the cam;
    a first elastic member sleeved on the shaft, and one end of the first elastic member resisting against the cam follower for providing an elastic force to the cam follower along an axis of the shaft;
    a first sleeve sleeved on the shaft, and non-rotatably connected to the cam follower;
    a second sleeve sleeved on the shaft, and non-rotatably connected to the cam;
    a second elastic member sleeved on the shaft, and configured for producing an elastic force for driving the first sleeve to rotate relative to the second sleeve; and
    a controlling member pressably sleeved on the shaft and abutting one of the cam and cam follower to drive the cam to disengage from the cam follower.

2. The hinge assembly as claimed in claim 1, wherein the cam follower is non-rotatably received in the first sleeve, and the first elastic member is resisted between the first sleeve and the cam follower; the cam is non-rotatably received in the second sleeve, and engages with the cam follower; the second elastic member connects the first sleeve to the second sleeve.

3. The hinge assembly as claimed in claim 1, wherein the first elastic member is a helical compressed spring resisted between the first sleeve and the cam follower.

4. The hinge assembly as claimed in claim 1, wherein the second elastic member is a torsion spring comprising a main portion sleeved on the cam and two protruding ends extending from the main portion.

5. The hinge assembly as claimed in claim 4, wherein the first sleeve defines a first assembling groove, the second sleeve defines a second assembling groove; one protruding end of the second elastic member engages in the first assembling groove of the first sleeve, the other protruding end of the second elastic member engages in the second assembling groove of the second sleeve.

6. The hinge assembly as claimed in claim 1, wherein the cam follower comprises a restricting portion sleeved on the shaft and non-rotatably received in the first sleeve.

7. The hinge assembly as claimed in claim 6, wherein the cam comprises a restricting portion sleeved on the shaft and non-rotatably received in the second sleeve.

8. The hinge assembly as claimed in claim 1, wherein the cam follower defines a plurality of valleys, and the cam follower forms a plurality of peaks configured for engaging with the valleys.

9. The hinge assembly as claimed in claim 1, wherein the shaft defines an annular groove in an end; the hinge assembly further comprises a retaining ring configured to engage in the annular groove of the shaft.

10. The hinge assembly as claimed in claim 1, wherein the controlling member is a hollow column, and sleeved on the shaft.

11. The hinge assembly as claimed in claim 10, wherein the controlling member defines two elongated cutouts in opposite sides; two assembling portions are formed on opposite sides of the shaft; the assembling portions are engaged in the elongated cutouts.

12. The hinge assembly as claimed in claim 1, wherein one end of the controlling member resists the cam, and the other end extends through the second sleeve.

13. A hinge assembly, comprising:
a shaft;
a cam non-rotatably sleeved on the shaft;
a cam follower sleeved on the shaft and rotatably engaging with the cam;
a first sleeve sleeved on the shaft, and non-rotatably connected to the cam follower;
a first elastic member sleeved on the shaft, and received within the first sleeve together with the cam follower; one end of the first elastic member resisting against the cam follower for providing an elastic force to the cam follower along an axis of the shaft;
a second sleeve sleeved on the shaft, and non-rotatably connected to the cam;
a second elastic member sleeved on the shaft, two ends of the second elastic member connected to the cam and cam follower, respectively, thereby producing a torsional elastic force for driving the cam to rotate relative to the cam follower; and
a controlling member pressably sleeved on the shaft, and abutting the cam or the cam follower to drive the cam to disengage from the cam follower, wherein when the cam engages with the cam follower driven by the elastic force of the first elastic member, the cam is non-rotatable relative to the cam follower; when one of the cam and the cam follower is pushed to disengage from the other one of the cam and the cam follower by the controlling member to a certain distance along the shaft, the cam rotates relative to the cam follower driven by the elastic force of the second elastic member.

14. The hinge assembly as claimed in claim 13, wherein the first elastic member is a helical compressed spring resisted between the first sleeve and the cam follower.

15. The hinge assembly as claimed in claim 13, wherein the second elastic member is a torsion spring comprising a main portion sleeved on the cam and two protruding ends extending from the main portion.

16. The hinge assembly as claimed in claim 13, wherein the cam follower defines a plurality of valleys, and the cam follower forms a plurality of peaks configured for engaging with the valleys.

17. The hinge assembly as claimed in claim 13, wherein the shaft defines an annular groove in an end; the hinge assembly further comprises a retaining ring configured to engage in the annular groove of the shaft.

18. The hinge assembly as claimed in claim 13, wherein the controlling member is a hollow column, and sleeved on the shaft.

19. The hinge assembly as claimed in claim 13, wherein the controlling member defines two elongated cutouts in opposite sides; two assembling portions are formed on opposite sides of the shaft; the assembling portions are engaged in the elongated cutouts.

* * * * *